United States Patent [19]

Hunt

[11] 4,387,930
[45] Jun. 14, 1983

[54] VEHICLE TRACTION DEVICE

[76] Inventor: Milby N. Hunt, 19 Manor Way, Galveston, Tex. 77550

[21] Appl. No.: 196,346

[22] Filed: Oct. 14, 1980

[51] Int. Cl.³ ............................................ B60B 15/00
[52] U.S. Cl. ........................................ 301/46; 152/1; 464/57; 301/9 DN
[58] Field of Search ................. 301/38 R, 40 S, 40 R, 301/41 R, 43, 44–47, 50–53, 9 DN; 152/1, 87, 88, 94–96; 64/15 C, 27 C; 464/57

[56] References Cited

U.S. PATENT DOCUMENTS

| 882,348 | 3/1908 | Schindler | 152/96 |
|---|---|---|---|
| 1,118,158 | 11/1914 | Siegfried | 152/94 |
| 2,171,844 | 9/1939 | Chaffin | 301/50 |
| 3,178,232 | 4/1965 | Ealey et al. | 301/51 |
| 3,380,779 | 4/1968 | Albright | 301/38 R |
| 3,860,297 | 1/1975 | Solis | 301/38 R |

FOREIGN PATENT DOCUMENTS

| 1004950 | 3/1957 | Fed. Rep. of Germany | 301/38 R |
|---|---|---|---|
| 552629 | 4/1943 | United Kingdom | 301/44 T |

Primary Examiner—H. Grant Skaggs
Attorney, Agent, or Firm—Browning, Bushman, Zamecki & Anderson

[57] ABSTRACT

An apparatus for providing additional traction to the wheels of a vehicle during inclement conditions utilizes an adapter to accommodate its use with a variety of sizes of vehicle wheels and has features to permit its convenient installation and removal from the wheels of the vehicle. A vertical disc has a plurality of traction elements mounted on its periphery to engage the terrain, with the disc being cooperatively connected to the wheel adapter by means of a large coil spring. The spring permits flexure of the disc and traction elements in four dimensions, i.e. rotatively about the wheel axis, horizontally about the longitudinal axis of the vehicle axle to permit the disc to cant inwardly into contact with the top of the wheel or tire of the vehicle, vertically with respect to the terrain, and along the horizontal axis of the wheel axle toward and away from the wheel. The use of the single spring to provide the various modes of flexure facilitates simplicity in the construction of the apparatus. Different traction elements are provided for snow, ice sand and mud, and are conveniently changeable for such conditions. A split disc mounting arrangement provides for convenient mounting and dismounting of a traction assembly to a mounting assembly without removing all the wheel lugs from the vehicle.

13 Claims, 7 Drawing Figures

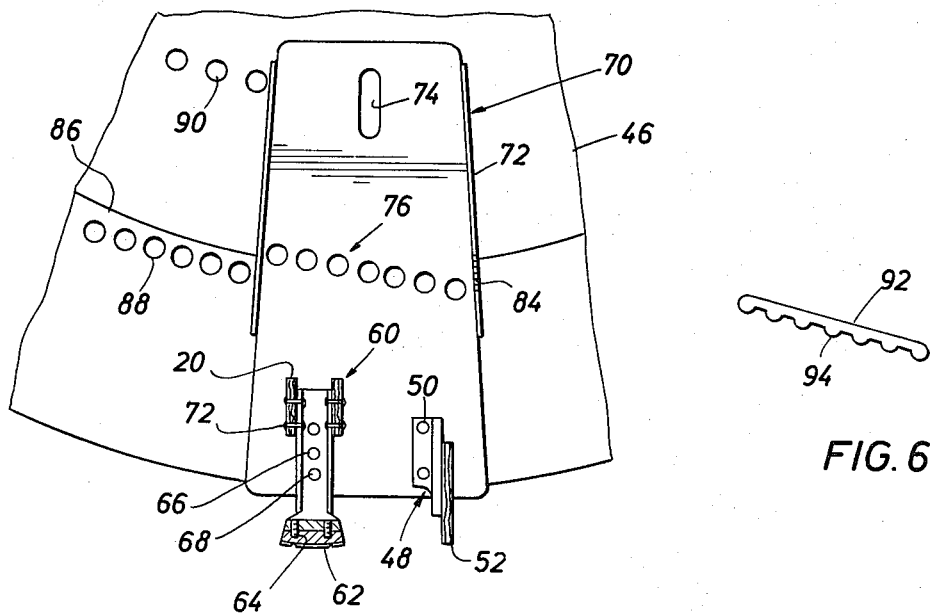
FIG. 5
FIG. 6
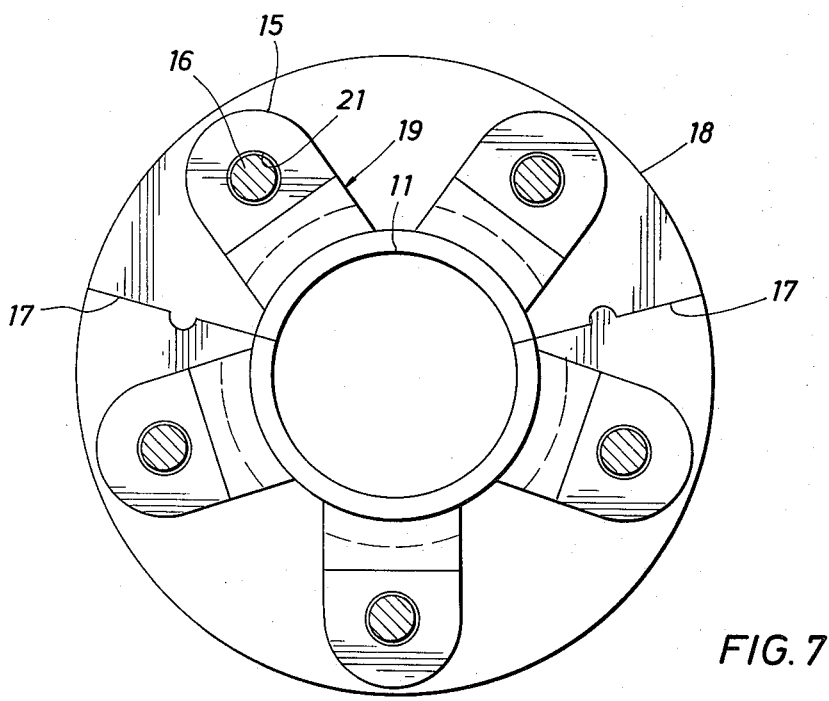
FIG. 7

VEHICLE TRACTION DEVICE

BACKGROUND OF THE INVENTION

This invention relates to a vehicle wheel traction device and more particularly to a conveniently removable traction apparatus for attachment to a tire carrying wheel mounted on a vehicle.

Tire chains are presently used on vehicles as a means to establish greater traction between the drive wheels of a vehicle and the terrain, especially on icy and snow covered roads. The disadvantages of chains are well known, the utmost being the difficulties of mounting and removing, and their relative ineffectiveness in providing traction on ice and hard packed snow. Moreover, each time the snow thaws or is cleared from the streets the chains have to be laboriously removed and stored inasmuch as they are not only noisy but are liable to injure the tires when used on dry pavement.

In order to overcome these and other objections to tire chains, various other traction devices have been designed. These devices have all had certain objectionable features, however, and none has been commercially successful. One such device utilized elongated, rigid spikes or gripping arms which were fastened to a face of the vehicle wheel and project radially outwardly beyond the periphery of the wheel to engage the surface of the road. This type of device has excellent gripping qualities and provides effective traction under even the most difficult driving conditions. Unfortunately, however, the rigid arms dig into and damage the pavement and, in addition, are frequently broken off or bent by obstacles in the roadway such as stones or railway tracks. Moreover, the gripping members used in this type of traction device are either permanently attached to the wheel and can not be removed when not in use, or they are mounted on the wheel in such a manner that their removal is extremely difficult.

Spikes or studs on tires are generally permanently mounted during winter months and have certain well known disadvantages in normal driving conditions such as limiting driving speed, noise, wear to the road surface and so on. As to wearing of road surfaces, stud equipped tires are often disallowed on selected roadways.

The above systems all have the disadvantage of being relatively unhandy to mount and dismount from the vehicle.

Another tire mounted traction device which appears to be easier to mount and dismount on a vehicle is shown in U.S. Pat. No. 2,986,190 to Lamb which shows a mounting disc that may be mounted on the vehicle during periods of inclement weather, while the individual traction members are removable from the disc so that they need be mounted only when additional traction is needed. Each traction member is a coil spring threadedly connected to the disc. Of course the greater the number of traction members used, the greater the inconvenience of mounting and dismounting the traction members. Additionally, all the lug nuts must be removed simultaneously to install the disc.

U.S. Pat. No. 3,861,752 shows an anti skid device for attachment to vehicle wheels by means of lug bolts and supported by the vehicle wheel. Traction members are moved between "stored" and "use" positions by means of a folding linkage. The use position moves the traction member to a point beneath the vehicle tire. Such a device wound tend to wear tires and would no doubt be noisy, the effect being similar to chains. Again all lug nuts would have to be removed simultaneously for mounting the apparatus.

Ceccucci U.S. Pat. No. 3,482,880 shows a device similar to Lamb in that individual traction members are attached to a disc, but have a stored position on the disc. Each traction member is biased by an individual spring into contact with the terrain. This would be an expensive apparatus to build. All lug bolts need be removed simultaneously for mounting the apparatus on a wheel.

Williams U.S. Pat. No. 2,494,850 shows a non-skid device mounted on a vehicle wheel although it is not apparent from the patent as to exactly how this is done. However, it appears that the device is mounted to apertures in the disc portion of a wheel which presumes that such apertures exist in all wheels. A rather complicated mechanism pivotally grips the side of each wheel and has a traction element that extends to the side of the tire. This apparatus would appear to be flimsily designed for its intended use.

U.S. Pat. No. 1,890,872 shows a device for duplex truck wheels having individually spring loaded traction members.

Fletcher U.S. Pat. No. 3,911,985 has a disc positioned on a vehicle axle which supports a plurality of traction prongs pivotally attached to a wheel and slidable on the disc. A control rod operable from the interior of the vehicle arcuates the rod to permit rotation of the disc. This device is extremely complex and would require major modification of a vehicle implement for use.

Each of the devices described above for providing additional emergency traction on a vehicle wheel has disadvantages as to effectiveness, simplicity of construction and thus cost, as well as inconvenience to install and operate.

It is therefore an object of the present invention to provide a new and improved vehicle traction apparatus which is simple in construction, effective in all types of weather and terrain conditions, and convenient to install and remove.

SUMMARY OF THE INVENTION

With this and other objects in view the present invention contemplates a vehicle traction device including a mounting ring that is conveniently detachable from an adapter plate. The adapter plate may be installed on the vehicle wheel more or less permanently during inclement weather periods. A very stiff spring, aligned longitudinally with the vehicle axle, attaches a disc to the mounting ring. The disc has traction elements mounted about its periphery to provide traction with the terrain, such traction being transmitted to the vehicle through the stiff spring.

Another aspect of the invention permits the traction elements to be conveniently moved between alternative positions on the disc so that different types of surface engaging elements are placed in contact with the terrain to accommodate varying surface conditions.

Yet another aspect of the invention utilizes a split adapter plate so that the apparatus may be mounted on a vehicle wheel without jacking up the vehicle.

Additionally, the traction elements may be arranged on a mounting plate that is conveniently radially adjustable for variations in tire diameters and for accommodating wear to the traction elements themselves.

BRIEF DESCRIPTION OF THE DRAWINGS

FIG. 5 shows an alternative mounting plate arrangement for mounting traction elements on the mounting disc;

FIG. 6 is an alternative mounting arrangement for mounting the mounting plate of FIG. 5 to the mounting disc; and FIG. 7 is a cross-sectional side elevation view taken along lines 7—7 of FIG. 1 showing the wheel adapter having a split ring configuration.

DETAILED DESCRIPTION OF THE INVENTION

Figure 1:
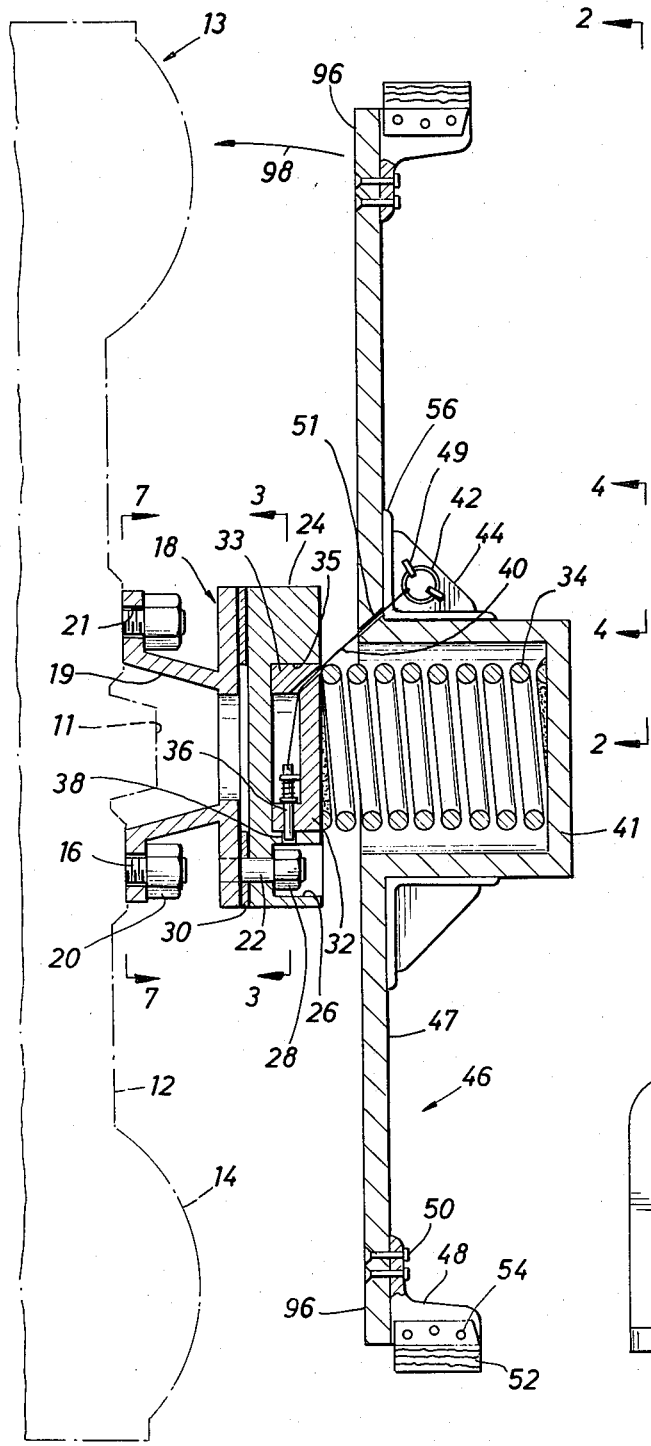
FIG. 1 is a cross-sectional front elevation view of a traction apparatus shown mounted on a vehicle wheel in accordance with the present invention.

Referring first to FIG. 1 of the drawings, a vehicle wheel 12 is shown having a tire 14 mounted thereon. Threaded lugs 16, which mount the wheel on the vehicle hub (not shown) extend horizontally outwardly from the wheel. A split ring type adapter plate 18 (FIG. 7) has radially extending mounting tangs 19 and mounting holes 21 in the tangs 19 to receive the lugs 16. Lug nuts 20 sized to fit the lugs 16, secure the tangs 19 to the wheel to hold the adapter plate 18 in place on the vehicle wheel.

The adapter plate 18 has lugs 22 projecting horizontally outwardly from the periphery of its face. A mounting ring 24 has circular recesses 26 on its outwardly facing side. Holes through the bottom surface of the recesses 26 are arranged to receive the lugs 22 for assembly of the mounting ring 24 on the adapter plate 18. Nuts 28 sized to fit lugs 22, secure the ring 24 to the plate 18. A spacer 30 is shown positioned between the plate 18 and mounting ring 24 to provide horizontal adjustment in the assembly.

A spring flange 32 is shown having a coil spring 34 attached thereto, as by welding, so that when assembled in the apparatus, it places the spring 34 with its longitudinal axis in a horizontal disposition. The flange 32 has an annular shoulder portion 33 that is sized for reception within a circular recess 35 in the outer face of mounting ring 24. Blind holes 38 are formed in the wall of recess 35 and are sized to receive mating spring biased pins 36, radially extending from the spring flange 32. Wires 40 are connected one end to spring pins 36, with the other end of wires 40 passing through holes in flange 32.

The stiff coiled spring 34 is attached at its other end to a recessed hub 41 on mounting disc 46 by welding or the like. The mounting disc 46 has gusset supports 44 on brackets 56 which are attached to the disc at the corner intersection of hub 41 and disc face 47. Clips 49 on the support 44 are arranged to hold a ring 42 which is attached to the other end of wire 40. The wire 40 passes through openings 51 in the disc 46 near the corner intersection of the hub 41 and face 47.

The outer peripheral edge of face 47 on disc 46 includes traction feet 48 attached by means of rivets 50 to the face 47 of disc 46. Elastomeric traction elements 52 are mounted by rivets 54 on the traction feet 48.

Figure 2:
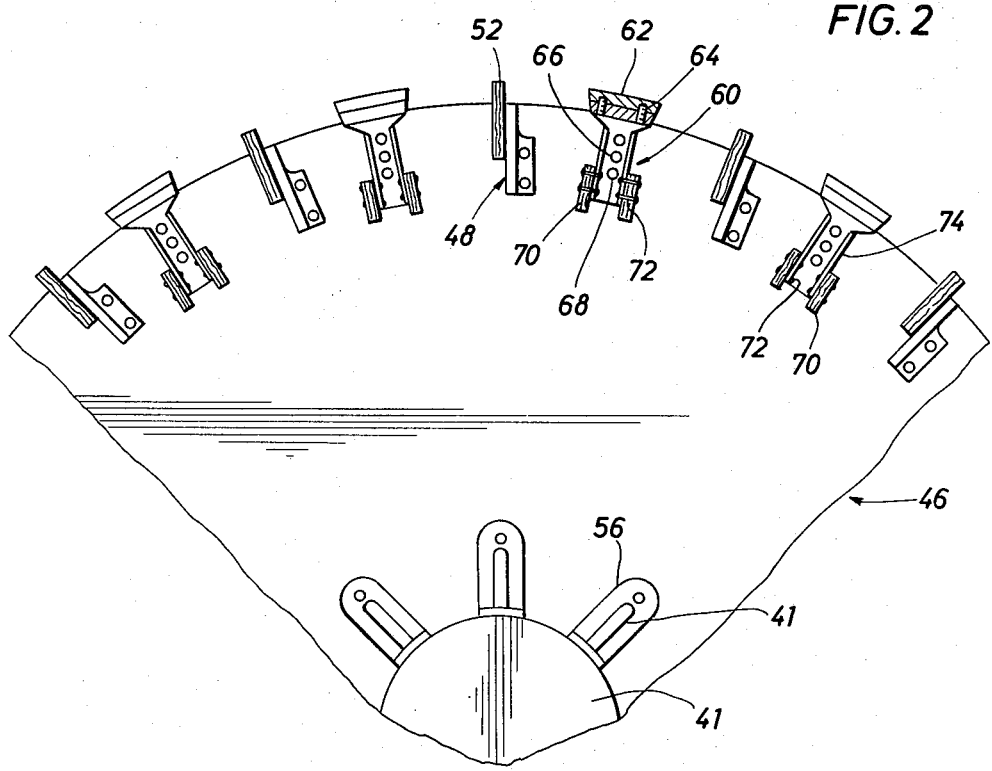
FIG. 2 is a partial side elevation view taken along lines 2—2 of FIG. 1 and showing a mounting disc for mounting traction elements.

Next referring to FIG. 2 of the drawings the disc 46 is partially shown in side elevation with the hub 41 in its center and gusses supports 44 formed on gusset brackets 56, radially spaced about the hub 41. Traction feet 48 are shown on the outer peripheral edge of disc 46 with traction elements 52 extending outwardly thereof. Shown positioned adjacent traction feet 48 is another type of traction feet 60 which have a malleable iron tread 62 connected to the feet 60 by means of allen head set screws 64. A permanently installed swivel pin 66 is positioned through a hole in feet 60 and has a cap on its outer end to rotatably hold the feet 60 in place on the disc 46. A pair of spring loaded pins 68 are positioned one on each side of pin 66 to releasably hold the feet in place about the pin 66 and prevent its rotation. The traction foot 60 has elastomeric traction elements 70 connected by means of rivets 72 to upwardly projecting parallel flange wall members 74 on each side of feet 60. By withdrawing pins 68 from aligned holes in the disc 46, the feet 60 are free to be rotated about pins 66 to move the end of feet 60 with elastomer elements 70 into position outwardly of the disc periphery. The traction feet 48 and 60 respectively are alternately arranged in side by side relation about the peripheral edge of disc 46.

Figure 3:
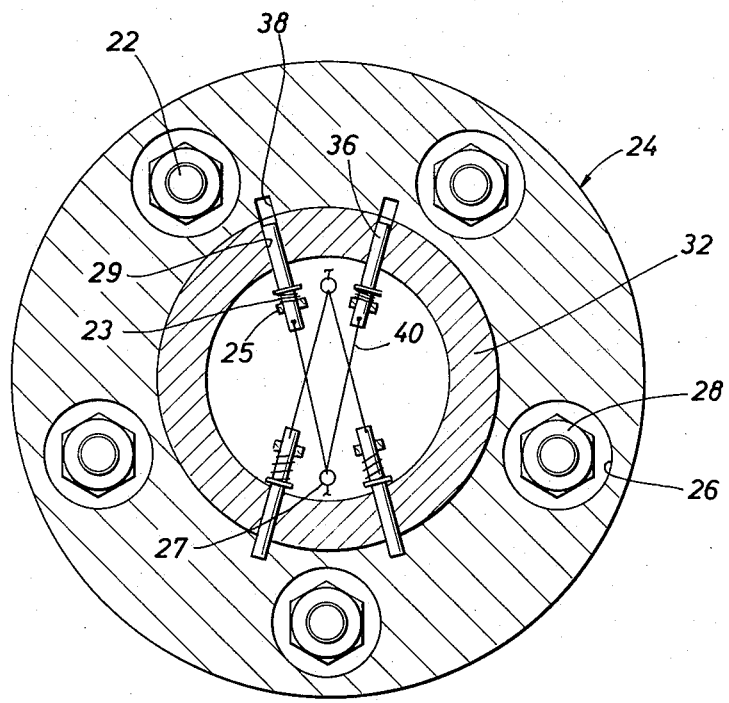
FIG. 3 is a cross-sectional side elevation view taken along lines 3—3 of FIG. 1 showing a mounting ring and spring flange to permit convenient mounting and removal of the apparatus from an adapter plate mounted on the vehicle wheel.

Next referring to FIG. 3 of the drawings the mounting ring 24 is shown in side elevation with recesses 26 and holes in the bottom surface thereof for receiving lugs 22 extending outwardly from adaptor plate 18. Spring biased pins 36 are shown retracted from the two top holes 38 in the mounting ring while the pins 36 on the bottom edge are inserted in holes 38. Wires 40 are shown connected to the inner ends of pins 36. Coil springs 23 are held against pins 36 by means of a spring retainer 25. Pairs of wires 40 connecting pairs of pins 36 are connected by a clasp 27 to join the wires prior to connection with ring 42 to permit the manipulation of multiple pins by movement of a single ring. Retraction of the wire 40 pulls the pin 36 against spring 23 into an opening 29 in the cylindrical wall of spring flange 32. The release of a retracting force on wire 40 permits the spring 23 to move pin 36 into blind hole 38 in the mounting ring 24.

Figure 4:
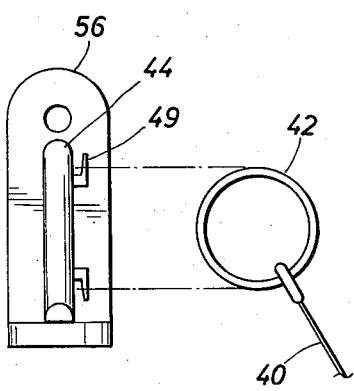
FIG. 4 is a detailed view of a gusset support on the mounting disc.

FIG. 4 shows in detail the gusset support 44 on bracket 56 with ring clips 49 for holding the ring 42 in place when not in use for unlocking the spring flange 32 from the retainer ring 24.

FIG. 5 shows an alternative method of mounting the traction feet 48 and 60 to the mounting disc 46. A channel mounting plate 70 has side channel wall portions 72 extending outwardly perpendicular to the mounting disc 46. This channel configuration of plate 70 adds stiffness to the mounting disc against bending forces when the traction elements are bearing on the terrain. The bottom wall of the channel plate 70 has an elongated slot 74 for receiving a bolt to fasten one end of the channel plate to the disc 46. Tapped holes 90 in the disc are sized to receive threaded ends of a mounting bolt passing through slot 74 to secure the channel plate to the disc. A series of holes 76 angularly arranged on the disc coincide with holes 88 on the disc 46 to secure the channel plate 70 and disc 46 to one another at a second point to render the assembly of the disc and channel plate stationary. By adjusting the position of the channel plate radially inwardly and outwardly relative to the disc, the position of the channel plate and traction elements mounted thereon can be adjusted. This is made possible by the arrangement of the series of holes 76. Vertical marks 84 on the side walls 72 of the channel plate are aligned with the holes 76 in the bottom of the channel plate, and by aligning such marks with an arcuate scribe line 86 on the disc, the channel plates may each be positioned identically on the disc to maintain a uniform circumferential adjustment of the channel plate 70 and attached traction elements. As shown in FIG. 5, traction feet 48 and 60 are mounted on the channel plate 70 similarly to the mounting of such feet directly to disc 46 as shown in FIG. 2. Referring again to FIG. 5, the channel plates are arranged to receive rivets 50 to mount elastomeric traction feet 48 to the channel plate 70. Likewise the channel plate 70 has holes arranged to receive pivot pins 66 and spring pins 68 respectively on the traction feet 60 for mounting feet 60 on the channel plate. The channel plate mounting of FIG. 5 adds another dimension of adjustment to the assembly and permits use of the apparatus with various diameters of tires and also permits adjustment when wear of traction elements requires lengthing of the radius of the traction elements away from the axis of rotation of the wheel.

FIG. 6 shows an alternative arrangement for attaching the channel plate 70 to the disc wherein slots 92 are angularly arranged on the channel plate in place of holes 76. A series of radii 94 are disposed adjacent the slot 92 and permit the channel plate to be moved relative to the disc by merely loosening a bolt (not shown), securing the two parts together rather than removing such bolt altogether and chancing misplacement of the bolt.

Referring now to FIG. 7 of the drawings, the split ring adapter plate 18 is shown from the wheel side toward the traction device. The adapter plate is split as shown at line 17 to form two completely seperable portions which when assembled together on the wheel 12 appear as shown in FIG. 7. The wheel lugs 16 project through holes 21 on flat portions 15 of inwardly projecting tangs 19. A hub 11 on the vehicle wheel 12 is shown projecting within the ring of tangs 19 on the adapter.

In the operation of the apparatus described above, when additional traction is required for a vehicle, the split ring type adapter plate (FIG. 7) is first mounted on the vehicle. This is done by removing two or three of the lug nuts 20 on the vehicle wheel and mounting one of the split ring segments of adapter plate 18 on the vehicle. These lug nuts are then replaced and tightened on the wheel. Subsequently, the remaining two or three lug nuts 20 are removed, with the previously tightened nuts holding the wheel 12 in place on the vehicle. The second portion of the split ring adapter 18 is then installed on the wheel to provide a full wheel adapter 18. Next the mounting ring 24 is attached to the adapter by passing the adapter lugs 22 through holes within the recesses 26 in the mounting ring 24 and securing this assembly with nuts 28. The assembly thus far described provides a wheel mounting assembly which may conveniently remain mounted on the vehicle wheel during a period of possible inclement weather.

When it is desired to add the traction assembly to the wheel mounting assembly, remaining parts which are preassembled, are mounted to the previously assembled wheel mounting assembly. This is done by placing the annular wall portion 33 of the spring flange 32 into the central recess 35 formed in the face of mounting ring 24. This is facilitated by removing rings 42 from the clips 49 on gusset support 44. The rings 42 are then pulled to retract pins 36 into openings 29 in the spring flange annular wall 33. When the spring flange 32 is fully seated in the recess 33, the rings 42 are released and springs 23 force pins 36 into blind holes 38 in the mounting ring 24. This locks the traction assembly in place.

If the traction elements on the disc 46 are too far extended radially with respect to the vehicle axle to permit the above described assemblege, the vehicle tires may be driven up on some sort of ramp, as for example, a narrow block of wood or the like, which will elevate the vehicle axle and leave the space to receive the traction device clear. A jack may also be used to thus elevate the vehicle wheel. After assembling the traction assembly to the wheel mounting assembly, the vehicle is driven off the ramp, whereupon, the engagement of the traction elements 48 and 60 with the terrain will cant the top part of the traction assembly inwardly (see arrow 98, FIG. 1) toward the vehicle tire until the inside face 96 of disc 46 engages the top side 13 of the tire.

Whenever it is preferable, because of terrain conditions or for whatever reason, to have all elastomeric elements in terrain contacting position, the traction feet 60 may be rotated on disc 46 to provide this option. To do so, spring loaded pins 68 are retracted from their mounting holes until they clear the face of disc 46 and the feet 60 are rotated about pin 66 to bring the alternate traction element into terrain contacting position.

The coil spring 34 is multiply functional to provide support to the traction disc and elements. The spring is made from a heavy coiled spring steel and is tightly wound to provide a stiff juncture between the mounting assembly and the traction assembly. It should be sufficiently stiff to absorb the major frictional forces developed by contact of the traction elements with the terrain in the form of its torsional rotation. In bending it again is of sufficient stiffness to bear most of the bending load applied to the traction assembly but permits the top of the disc 46 to bear lightly against the top outer surface 13 of the vehicle tire. Its stiffness in compression is sufficient to absorb any transverse load and thereby prevent damage to the assembly from contact of various elements of the apparatus when the apparatus is rotating. Its bending stiffness also maintains the traction elements in contact with the terrain.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. Traction apparatus for mounting on the tire carrying wheel of a vehicle having lugs attaching the wheel to a hub, comprising:
   adapter means for attachment to the lugs;
   vertical disc means;
   a plurality of traction elements mounted about the peripheral edge of said disc means and arranged to trace the outer circumference of the tire on the wheel, said traction elements being spaced from the tire when said disc is not bearing on the terrain; and
   cylindrical coil spring means between the central portion of said disc and said adapter means, said spring means being aligned substantially coaxially and longitudinally with the rotational axis of the wheel, said spring means being sufficiently flexible so as to permit said disc means to cant relative to said wheel when said disc means is bearing on the terrain.

2. The apparatus of claim 1 and further including spring flange means fixedly attached to one end of said coil spring means, the other end of said coil spring means being fixedly attached to said disc to form a spring and disc assembly.

3. The apparatus of claim 2 and further including annular means for attachment with said adapter means wherein said annular means has a flange forming a cylindrical wall portion having its longitudinal axis in coincidence with the wheel axis; spaced holes formed in said wall portion; and pin means on said spring flange means for reception within said holes to provide a means for conveniently mounting the spring and disc assembly on said adapter means.

4. The apparatus of claim 3 wherein said pin means includes a plurality of spring loaded pins and further including line means attached to more than one of said pins, so that movement of said line means in one direction retracts said attached pins from reception within said holes to permit removal of said spring and disc assembly from said adapter.

5. The apparatus of claim 1 wherein said traction elements are comprised of alternate flexible feet and rigid feet.

6. The apparatus of claim 5 wherein said rigid feet are mounted on a plate movable between alternate first and second positions; said rigid feet further having flexible portions; said first position placing said rigid feet in an outwardly facing, terrain contacting position; and said second position placing said flexible portion in an outwardly facing, terrain contacting position.

7. The apparatus of claim 1 and further including traction element mounting means, said traction elements being attached to said mounting means; and means on said disc and said mounting means to permit convenient radial adjustment of said traction elements toward and away from the rotational axis of the wheel.

8. The apparatus of claim 7 and further including an attaching means radially spaced on said disc means and arranged to matingly receive cooperative attaching means on said traction element mounting means.

9. A removable traction device for mounting on the wheel of a vehicle, comprising:
an adapter for mounting on the wheel of the vehicle;
disc means attached to said adapter;
cylindrical coil spring means attached between the central portion of said disc and said adapter, said spring means being aligned substantially coaxially and longitudinally with the rotational axis of said wheel, said spring means permitting canting of said disc relative to said wheel; and
traction means mounted on said disc for frictionally engaging the terrain over which the vehicle is moving.

10. A removable traction device for mounting on the wheel of a vehicle, comprising:
a disc;
means for mounting said disc to the wheel of a vehicle comprising adapter means for attachment to the wheel, and a horizontally disposed, cylindrical coil spring extending between and attached to said adapter means and the central portion of said disc, said spring being aligned generally coaxially and longitudinally with the rotational axis of said wheel and permitting said disc to cant relative to said wheel:
traction means mounted on said disc, and traction means having a first flexible terrain engaging position and a second rigid terrain engaging position, said traction means having a generally flat, terrain-engaging surface in said second position;
means for conveniently moving said traction means between said first and second positions.

11. Traction apparatus for mounting on the tire carrying wheel of a vehicle having lugs attaching the wheel to a hub, comprising:
a disc having a plurality of radially extending traction elements fixedly secured to the disc;
an adapter ring for mounting on the wheel lugs of the vehicle, said adapter ring being comprised of at least two separable segments arranged to resemble a split ring when attached to the vehicle wheel; and
cylindrical coil spring means connected between said adapter ring and the central portion of said disc, said spring means being aligned substantially coaxially and longitudinally with the rotational axis of said wheel and permitting said disc to cant relative to said wheel.

12. The apparatus of claim 11 wherein said adapter ring is sufficiently segmented so that each portion may be mounted on the vehicle wheel without removing more than two thirds of its lug nuts.

13. The apparatus of claim 11 wherein said adapter ring has lugs for connection with said spring means and wherein said spring is a heavy, stiff coiled spring which is fixedly attached to said adapter ring and said disc.

* * * * *